(12) United States Patent
Griessbaum et al.

(10) Patent No.: US 7,548,072 B2
(45) Date of Patent: Jun. 16, 2009

(54) POTENTIAL SEPARATION FOR FILLING LEVEL RADAR

(75) Inventors: Karl Griessbaum, Muehlenbach (DE);
Juergen Motzer, Gengenbach (DE);
Thomas Deck, Wolfach (DE); Josef Fehrenbach, Haslach (DE); Winfried Rauer, Fischerbach (DE)

(73) Assignee: Vega Grieshaber KG, Wolfach (DE)

( * ) Notice: Subject to any disclaimer, the term of this patent is extended or adjusted under 35 U.S.C. 154(b) by 184 days.

(21) Appl. No.: 11/624,462

(22) Filed: Jan. 18, 2007

(65) Prior Publication Data
US 2007/0176823 A1    Aug. 2, 2007

Related U.S. Application Data

(60) Provisional application No. 60/789,227, filed on Apr. 4, 2006, provisional application No. 60/763,020, filed on Jan. 27, 2006.

(30) Foreign Application Priority Data
Apr. 4, 2006    (DE)    ........................ 10 2006 015 659

(51) Int. Cl.
*G01R 27/32*    (2006.01)
(52) U.S. Cl. ........................ 324/644; 324/636; 324/639
(58) Field of Classification Search ................. 342/124; 324/644, 637, 639
See application file for complete search history.

(56) References Cited

U.S. PATENT DOCUMENTS

| | | | |
|---|---|---|---|
| 5,872,494 A | 2/1999 | Palan et al. | |
| 6,320,532 B1 | 11/2001 | Diede | |
| 6,401,532 B2 | 6/2002 | Lubbers | |
| 6,956,382 B2 * | 10/2005 | Nilsson | ...................... 324/644 |
| 2001/0047685 A1 | 12/2001 | Lubbers | |
| 2004/0100281 A1 | 5/2004 | Nilsson | |
| 2004/0183550 A1 * | 9/2004 | Fehrenbach et al. | ......... 324/662 |

FOREIGN PATENT DOCUMENTS

| | | |
|---|---|---|
| EP | 0 234 479 | 9/1987 |
| EP | 0762 089 | 3/1997 |
| EP | 0 882 955 | 12/1998 |
| EP | 1 562 051 | 8/2005 |
| WO | 2005/038414 | 4/2005 |
| WO | 2005/075944 | 8/2005 |

OTHER PUBLICATIONS

Kamp, "Filling level measuring technology in theory and practice", Endress & Hauser, 1997, pp. 202-207.

* cited by examiner

*Primary Examiner*—Thomas H Tarcza
*Assistant Examiner*—Timothy A Brainard
(74) *Attorney, Agent, or Firm*—Fay Kaplun & Marcin, LLP

(57) ABSTRACT

Both in potential separation in the microwave path, and in potential separation directly between the two-wire loop and the output circuit, the quality of signal transmission may be negatively affected. A filling level radar device with potential separation within the electronics unit is stated, wherein potential separation does not separate analogue signals but instead separates digital signals or direct-current-free alternating signals. For example, the separation line leads through digital signal connections or alternating-voltage signal connections. As a result of this the expenditure for potential separation may be reduced and the transmission quality may be improved.

25 Claims, 14 Drawing Sheets

_US 7,548,072 B2_

POTENTIAL SEPARATION FOR FILLING LEVEL RADAR

REFERENCE TO RELATED APPLICATIONS

This application claims the benefit of the filing date of German Patent Application Ser. No. 10 2006 015 659.5 filed Apr. 4, 2006; U.S. Provisional Patent Application Ser. No. 60/789,227 filed Apr. 4, 2006; and U.S. Provisional Patent Application Ser. No. 60/763,020 filed Jan. 27, 2006, the disclosure of which applications is hereby incorporated herein by reference.

FIELD OF THE INVENTION

The present invention relates to filling level measuring. In particular the present invention relates to filling level radar with potential separation for measuring the filling level in a container and for connection to a two-wire loop, as well as to a method for measuring the filling level.

BACKGROUND INFORMATION

Known filling level measuring devices comprise an aerial for transmitting and receiving radar waves or microwaves, and an electronics unit which generates the signals to be emitted and which evaluates the received signals.

Furthermore, potential separation may be provided. For considerations relating to measuring technology and for safety reasons the potential of the electrical supply line of a radar sensor should be separated from the potential of the, often metallic, filling level container. This may for example result in a reduction in noise effects during measuring, and in a reduction in the susceptibility to interference of the measuring signals. Furthermore, such isolation may result in increased safety, for example in relation to avoiding fires that may occur as a result of a short circuit or a defect in the electrical supply line or in the electronics of the filling level radar. Thus, undesirable spark-over could, for example, lead to ignition of, or damage to, the feed material.

Such potential separation may be provided in the microwave path. However, this may result in signal impairment of the microwave transmission signal and receiving signal in the form of signal attenuation or reflections due to mismatching. In particular in the case of very high microwave frequencies implementation may be made difficult because discrete components for separation may not be available, and line elements, as a result of their small dimensions, may only be produced with reproducibly good characteristics at great expense.

U.S. Pat. No. 6,956,382 discloses potential separation which is arranged outside the electronics unit, between the two-conductor (i.e. two-wire) loop and the output circuit. Regulating the loop current of the output circuit is separated from the two-conductor loop by means of potential separation.

Since in the case of sensors with a 4 . . . 20 mA two-conductor connection the current on the two-conductor loop may have to be regulated by the output circuit while at the same time potential separation between the two-conductor loop and the output circuit may have to be observed, it may be necessary to also transmit such signals across the non-conducting separation point, which signals may be less well suited to transmission across such a separation point. This relates not only to the current-sensing signal (the actual value of regulation), but also to the regulating signal of the regulator. Both signals are usually analogue direct-voltage signals; in the case of the current-sensing signal, moreover, exact transmission of the amplitude value may be necessary. This may not be possible with simple optical couplers. The expenditure for potential separation between the output circuit and the two-conductor loop may therefore be relatively high.

SUMMARY OF INVENTION

According to an exemplary embodiment of the present invention, a filling level radar device with potential separation for measuring a filling level in a tank and for connection to a two-conductor loop is stated, with the filling level radar comprising an electronics unit for generating a transmission signal, for receiving and evaluating a receiving signal, and for generating and emitting an output signal that is based on the evaluated receiving signal and that represents the filling level, and potential separation within the electronics unit for the galvanic separation of first signals in a first region of the electronics unit from second signals in a second region of the electronics unit, wherein the electronics unit comprises an input- and output circuit that is designed for regulating and emitting the output signal and that is arranged in the first region, and wherein the generation of the transmission signal takes place in the second region.

In this way the filling level radar according to an aspect of the invention comprises potential separation that is located within the electronics. To this effect the separation line that is defined by potential separation may lead through digital signal connections or alternating signal connections.

In this way digital signals or direct-voltage-free alternating signals may be separated.

According to a further exemplary embodiment of the present invention the input- and output circuit is designed for receiving external input signals.

The input signals can, for example, be transmitted by way of the two-conductor loop and are used, for example, for configuring the electronics unit or the energy supply. According to another exemplary embodiment of the present invention, receiving the external input signals may also take place by way of manual input or in a non-contacting manner by way of a radio signal or some other signal (for example an acoustic signal).

According to a further exemplary embodiment of the present invention, the input- and output circuit is designed for regulating an output current of the two-conductor loop.

In this way the measured values may be transmitted by way of the two-conductor current loop. In this process, the actual value of the regulation is conveyed from the two-conductor loop to the input- and output circuit and may not need to be transmitted by way of the potential separation.

According to a further exemplary embodiment of the present invention, the output signal is a digital output signal, wherein the input- and output circuit is furthermore designed to modulate the digital output signal and to demodulate a digital input signal.

According to a further exemplary embodiment of the present invention, the electronics unit further comprises a voltage supply for supplying the input- and output circuit (first electronics component) of the electronics unit with a first operating signal and for supplying a second electronics component of the electronics unit with a second operating signal, wherein potential separation is designed for separating the first operating signal from the second operating signal within the voltage supply.

Potential separation thus not only separates the input- and output circuit from the transmission signal generation but may also separate various regions of the voltage supply from each other. In this manner, continuous potential separation within the electronics unit may be provided, which separates various functional regions of the electronics unit, including its energy supply, from each other.

According to a further exemplary embodiment of the present invention, potential separation comprises inductive separation within the voltage supply.

Furthermore, within the voltage supply other types of separation may be possible, such as, for example, capacitive separation.

According to a further exemplary embodiment of the present invention, the electronics unit further comprises an evaluation circuit for evaluating the receiving signal.

In this arrangement the receiving signal may be a digitalised receiving signal or an analogue receiving signal.

According to a further exemplary embodiment of the present invention, evaluation of the receiving signal comprises identification of a filling level echo and the provision of a digitalised filling level value to the input- and output circuit. Furthermore, evaluation of the receiving signal may comprise measuring the distance from the feed material.

According to a further exemplary embodiment of the present invention, the electronics unit further comprises a transmitter for generating the transmission signal.

The transmitter may be designed as a microwave transmission circuit. Furthermore, the transmitter may comprise a clock pulse circuit, oscillators, modulation circuits and/or transmission amplifiers.

According to a further exemplary embodiment of the present invention, the electronics unit further comprises a receiver for receiving the measuring signal. According to a further exemplary embodiment of the present invention, the receiver may be designed as a microwave receiving circuit.

Furthermore, the receiver may comprise a receiving amplifier, a mixer, clock pulse circuits, oscillators, filters, intermediate frequency amplifiers, demodulators, logarithmic devices and/or analogue/digital converters.

According to a further exemplary embodiment of the present invention, the voltage supply comprises at least one element selected from the group consisting of a DC/DC converter, filter, voltage regulator and storage capacitor.

The DC/DC converter is, for example, designed with inductive separation within the voltage supply.

According to a further exemplary embodiment of the present invention, potential separation is designed to separate digital signals.

Digital signals may be easy to separate. The expenditure involved in potential separation of digital signals may be significantly less than the corresponding expenditure that would have to be incurred for separating analogue signals.

According to a further exemplary embodiment of the present invention, potential separation is designed to separate direct-voltage-free alternating signals.

The separation of direct-voltage-free alternating signals may also be simple when compared to the separation of analogue direct-voltage signals.

According to a further exemplary embodiment of the present invention, potential separation takes place within the evaluation circuit.

In this arrangement the evaluation circuit comprises, for example, two microprocessors or microcontrollers that by way of optical couplers or (inductive transformers) or a capacitive coupling with capacitors are separated from each other into a go-and-return line. To this effect the evaluation circuit is designed to carry out signal evaluation and receives an echo profile, from which the measured value to be output may then be formed.

According to a further exemplary embodiment of the present invention, transmission of the filling level measuring value takes place directly from the second microcontroller (which is located in the second region) by way of potential separation (for example by means of an optical coupler) directly to a current regulator of the input- and output circuit. In this way the first microprocessor (which is located in the first region of the electronics unit) is bypassed. In this way, even in the case of a malfunction in the first microprocessor, reliable transmission of signals from the second microprocessor to the current regulator of the input- and output circuit may be ensured.

According to a further exemplary embodiment of the present invention, potential separation takes place on the one hand between the evaluation circuit that is arranged in the first region, and on the other hand between the receiver that is arranged in the second region.

Thus not only the input- and output circuit but also the evaluation circuit is located in the first region, i.e. on that side of the electronics unit, which side faces the two-conductor loop.

According to a further exemplary embodiment of the present invention, potential separation takes place within the receiver.

For example, in this arrangement the intermediate frequency signal, which is an alternating voltage signal free of any direct voltage, is separated. Separation takes place, for example, by means of capacitors.

According to a further exemplary embodiment of the present invention, potential separation comprises an optical coupler.

According to a further exemplary embodiment of the present invention, the filling level radar is designed for connection to a two-conductor loop for supplying energy to the filling level measuring device and for emitting the output signals to a single line pair.

The two-conductor loop can, for example, be a 4 ... 20 mA two-conductor current loop.

According to a further exemplary embodiment of the present invention, a method for measuring a filling level is stated, which method involves the following steps:

Generating a transmission signal, receiving and evaluating a receiving signal, generating and emitting an output signal that is based on the evaluated receiving signal that represents the filling level, separating first signals in a first region of the electronics unit from second signals in a second region of the electronics unit by potential separation within the electronics unit, and regulating and emitting the output signal by way of an input- and output circuit that is arranged in the first region, wherein generation of the transmission signal takes place in the second region.

According to a further exemplary embodiment of the present invention, the method further involves receiving external input signals, and regulating an output current of a two-conductor loop by way of the input- and output circuit.

Furthermore, the input- and output circuit may be designed for modulating a digital output signal and for demodulating a digital input signal.

In this way a method may be provided which may ensure simple separation of signals within the electronics unit. The signals to be separated are, for example, digital signals or direct-voltage-free alternating signals.

BRIEF DESCRIPTION OF DRAWINGS

Below, exemplary embodiments of the present invention are described with reference to the figures.

Figure 1A:
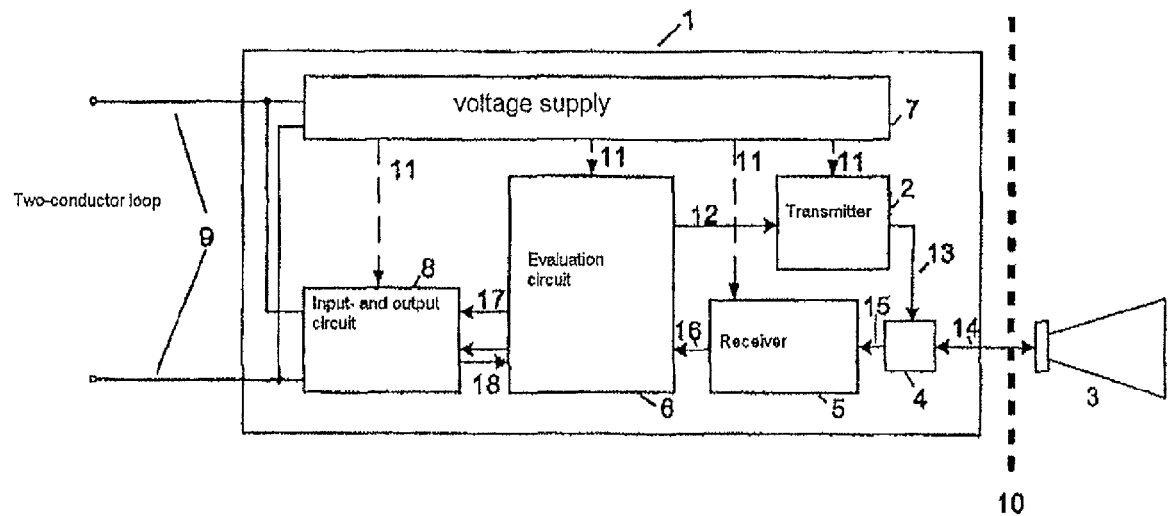
FIG. 1A shows a diagrammatic view of a filling level radar device with potential separation in the microwave path.

The illustrations in the figures are diagrammatic and not to scale.

DETAILED DESCRIPTION

In the following description of the figures the same reference characters are used for identical or similar elements.

FIG. 1A shows a diagrammatic view of a filling level radar device with potential separation 10 in the microwave path 14. In this arrangement the filling level radar comprises an electronics unit 1 that is connected to a two-conductor loop 9. The electronics unit 1 comprises a voltage supply 7 with a DC/DC converter, one or several filters, one or several voltage regulators and one or several storage capacitors. Furthermore, the electronics unit 1 comprises an input- and output circuit 8, an evaluation circuit 6, a transmitter 2, a receiver 5 and a circuit for separating the transmission and receiving path 4, which comprises, for example, a directional coupler or a circulator.

The voltage supply 7 is connected to the input- and output circuit 8, the evaluation circuit 6, the transmitter 2 and the receiver 5 by way of the line 11 and supplies these units with energy.

The transmitter 2 generates a transmission signal 13 that is conveyed to the circuit for separating the transmission path from the receiving path 4. By way of the microwave path 14 the transmission signal is then transmitted to the aerial 3, which emits the signal to the feed material and which receives a corresponding receiving signal that is transmitted to the directional coupler 4 also by way of the microwave line 14. The receiving signal is then conveyed to the receiver 5 by way of the microwave line 15, which receiver 5 then transmits the signal to the evaluation circuit 6 by way of the line 16.

The line 16 is designed to convey the receiver output signal to the evaluation circuit 6. For example, these are digital signals if the receiving circuit 5 comprises a corresponding analogue-digital converter.

By way of the line 17 the evaluation circuit 6 is connected to the input- and output circuit 8 for conveying the filling level measuring value (evaluated receiving signal). Likewise, by way of the line 18 for internal transmission of digital communication signals, the input- and output circuit 8 is connected to the evaluation circuit 6.

The lines 13, 14, 15 may, for example, be microwave lines.

The transmitter 2 is, for example, a microwave transmission circuit containing, for example, clock pulse circuits, oscillators, modulation circuits and/or transmission amplifiers.

The aerial 3 is, for example, a horn aerial, rod aerial, patch aerial or parabolic aerial. In the case of line-guided microwave filling level measuring, instead of using an aerial, a waveguide, e.g. a steel cable, may be used.

The circuit 4 for separating the transmission path from the receiving path can, for example, be a directional coupler or a circulator.

The receiver 5 can, for example, be designed as a microwave receiving circuit with receiving amplifier, mixer, clock pulse circuits, oscillators, filters, intermediate frequency amplifier, demodulator, logarithmic device and/or an A/D converter The evaluation circuit 6 is used for evaluating the digitalised receiving signal, for identifying the feed material echo, for measuring the distance to the feed material, and for providing a digital filling level value.

The two-conductor loop 9 is used for accommodating the sensor and the measuring value output on a single line pair; said two-conductor loop 9 is, for example, designed as a 4 . . . 20 mA two-conductor current loop.

The line 12 is used for activating the transmission circuit 2 by means of the evaluation circuit 6.

If potential separation 10 in the microwave line 14 or in a microstrip line is arranged between the hybrid coupler 4 (or circulator 4) and the aerial 3, losses due to mismatching may occur.

Figure 1B:
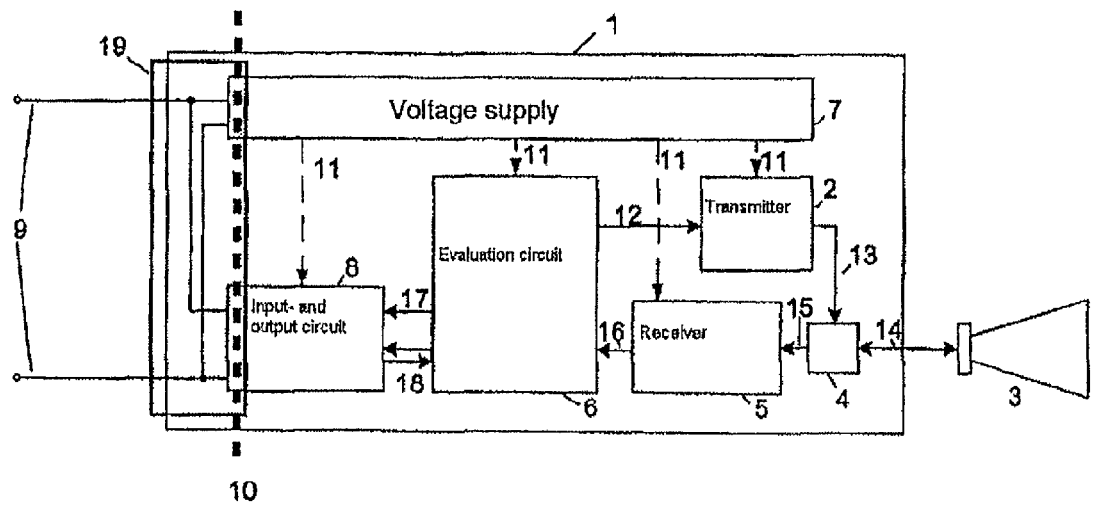
FIG. 1B shows a diagrammatic view of a filling level radar device with potential separation between the two-conductor loop and the electronics unit.

FIG. 1B shows a diagrammatic view of a filling level radar device with potential separation 10 between the two-conductor loop 9 and the input- and output circuit 8. Such potential separation is disclosed in U.S. Pat. No. 6,956,382.

An isolation circuit 19 is provided which provides potential separation between the two-conductor loop 9 on the one hand, and the voltage supply 7 and output circuit 8 on the other hand. A regulating element for regulating the output current of the 4 . . . 20 mA two-conductor current loop 9 on the basis of a corresponding desired value forms an essential component of the output circuit 8. The regulated analogue signal then may have to be transmitted to the two-conductor loop 9 by way of potential separation 10. Likewise, the actual value of the regulation may have to be transmitted from the two-conductor loop to the input- and output circuit 8 across the potential separation 10.

These are analogue signals whose transmission across such potential separation may be expensive.

Figure 2:
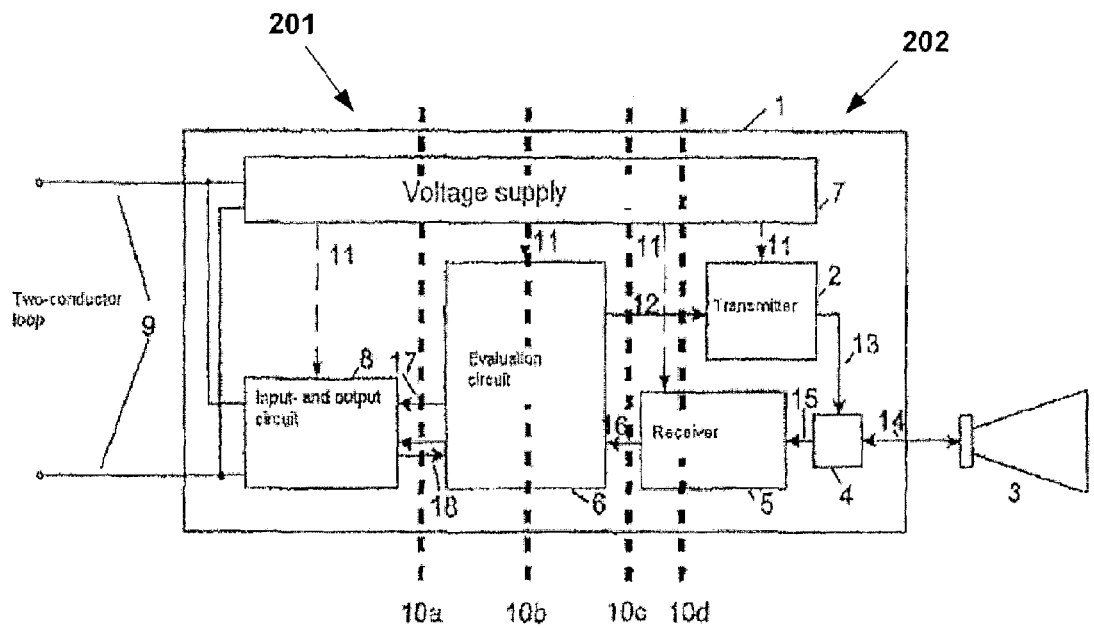
FIG. 2 shows a diagrammatic view of a filling level radar device according to several exemplary embodiments of the present invention.

FIG. 2 shows a diagrammatic view of a filling level radar device with potential separation arrangements 10a, 10b, 10c, 10d according to exemplary embodiments of the present invention. In this design the input- and output circuit 8 is always arranged on the side of the two-conductor loop of the electronics unit 1 (i.e. within the first region 201). In contrast to this, the transmitter 2 is always arranged on the other side (i.e. the second region 202). Possible arrangements of potential separation 10 are shown by the dashed lines 10a, 10b, 10c and 10d.

Potential separation 10a between the input- and output circuit 8 and the evaluation circuit 6 is effected by the signal lines 17 and 18 and by the voltage supply 7.

A second possible (alternative) potential separation 10b is effected by the evaluation circuit 6 and by the voltage supply 7.

The dashed line 10c shows a further option of potential separation. In this case, potential separation is effected between the evaluation circuit 6 on the one hand, and the transmitter 2 and the receiver 5 on the other hand by way of the signal lines 12 and 16 and by way of the voltage supply 7.

The dashed line 10d shows a fourth arrangement of potential separation through the receiver 5, the voltage supply 7 and the signal line 12.

Figure 3:
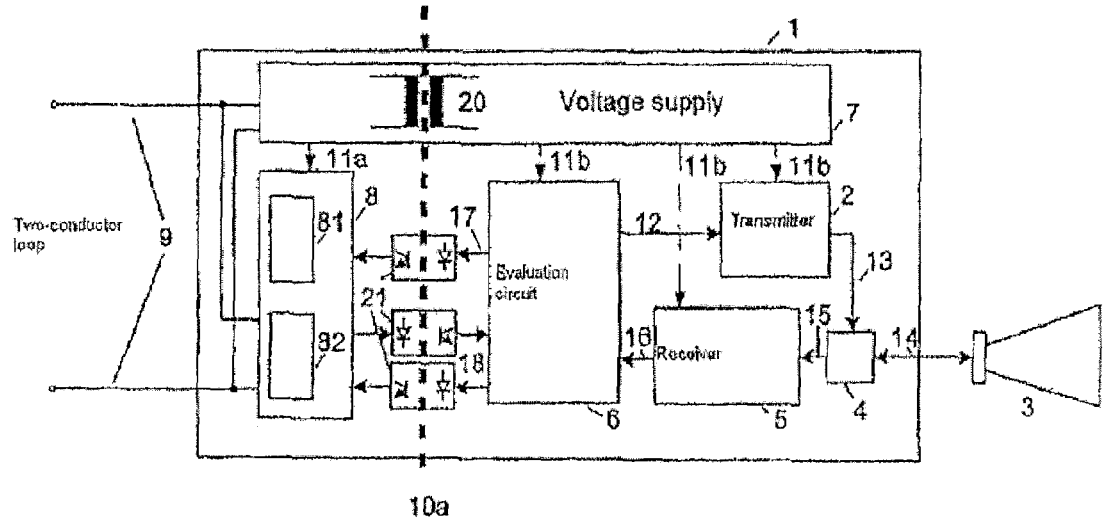
FIG. 3 shows a diagrammatic view of a filling level radar device according to an exemplary embodiment of the present invention.

FIG. 3 shows a block diagram of a filling level radar device with potential separation 10a according to one exemplary embodiment of the present invention. As shown in FIG. 3 potential separation 10a extends through the signal lines 17 and 18 and through the voltage supply 7. Within the voltage supply 7 a DC/DC converter with inductive separation within the voltage supply is provided, as indicated by the reference character 20.

Potential separation between the evaluation circuit 6 and the input- and output circuit 8 is effected in the signal lines 17, 18, for example by way of the optical coupler 21. As an alternative, transformers and capacitive couplings with capacitors in the go-and-return line may also be provided.

The input- and output circuit 8 comprises a current regulator 81 for regulating the output current 4 . . . 20 mA in the case of a two-conductor current loop, and if applicable comprises a modem 82 for digital communication with a modulator/demodulator for modulating and demodulating digitally transmitted data.

Figure 4A:
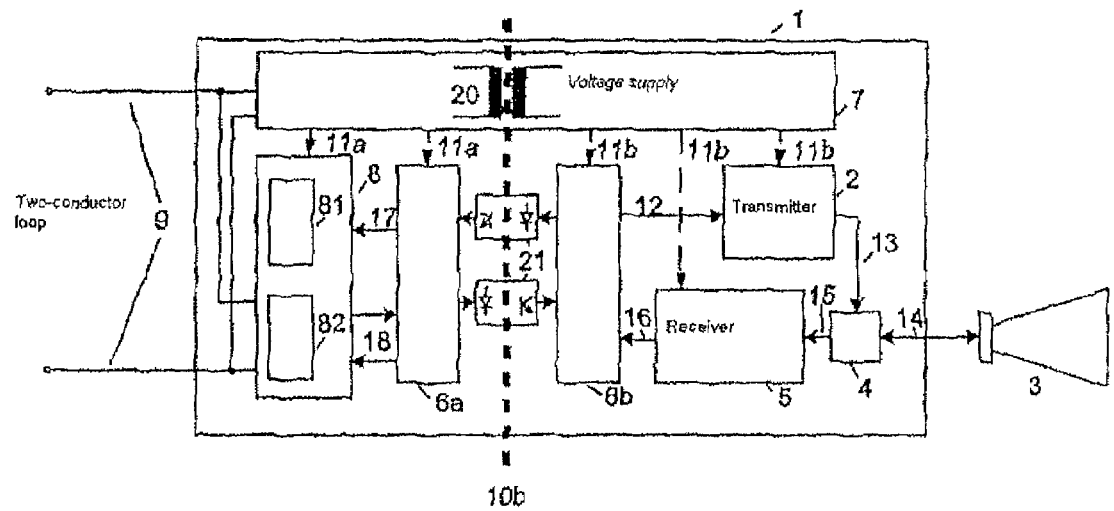
FIG. 4A shows a diagrammatic view of a filling level radar device according to an exemplary embodiment of the present invention.

FIG. 4A shows a block diagram of a filling level radar device with potential separation 10b according to a further exemplary embodiment of the present invention. In this arrangement, potential separation 10b extends through the voltage supply 7 and through the evaluation circuit 6a, 6b. Each of the two parts 6a, 6b of the evaluation circuit comprises a microprocessor of its own. Between the two microprocessors an optical coupler 21, capacitive separation by way of capacitors, or some other suitable type of potential separation is provided.

The first part of the evaluation circuit 6a is supplied with voltage by way of the supply line 11a, the second part of the evaluation circuit 6b is supplied with voltage by way of the supply line 11b. The supply lines 11a and 11b are located in various regions of the electronics unit 1 that are separated from each other by way of potential separation 10b.

Figure 4B:
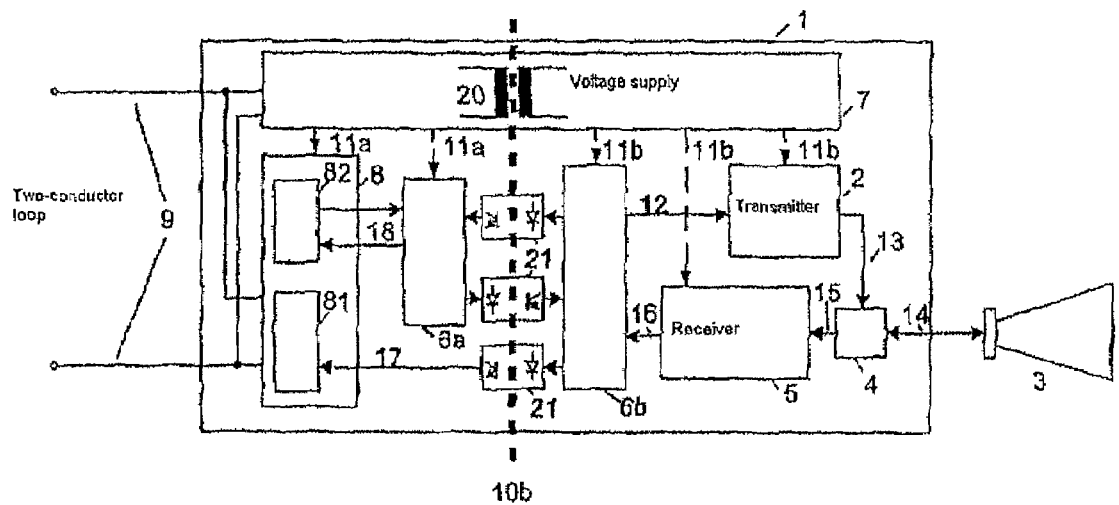
FIG. 4B shows a diagrammatic view of a filling level radar device according to a further exemplary embodiment of the present invention.

FIG. 4B shows a block diagram of a filling level radar device with potential separation 10b according to a further exemplary embodiment of the present invention. The difference when compared to FIG. 4A merely consists of the transmission of the filling level measuring value by way of the line 17 being effected directly from the evaluation circuit 6b to the current regulator 81 within the input- and output circuit 8, rather than by way of the evaluation circuit 6a.

The implementation of a safety concept according to an existing standard (IEC 61 508/61 515, key word SIL: Safety Integrity Level) provides the background to this solution.

According to this concept, all the error sources that can lead to an incorrect output of the filling level measuring value are to be excluded as far as possible. Since in this arrangement the filling level measuring value is transmitted directly from the evaluation circuit 6b to the output circuit for the relative loop current 81, all the error sources that may result from operation of the evaluation circuit 6a are excluded for determining the filling level measuring value. This may improve operational reliability and safety requirements in relation to the evaluation circuit 6a, and in this way may reduce production expenditure.

Figure 5:
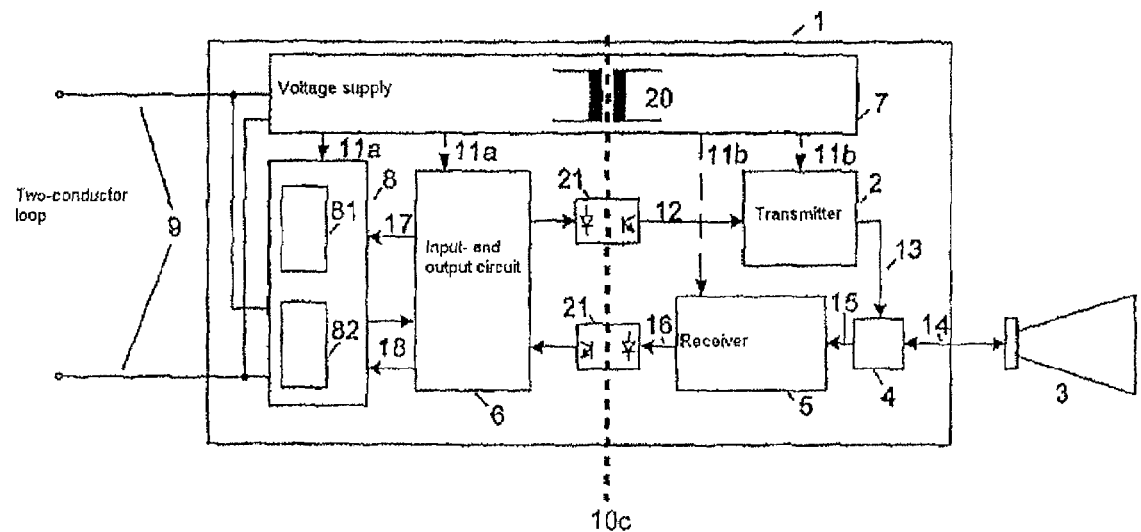
FIG. 5 shows a diagrammatic view of a filling level radar device according to a further exemplary embodiment of the present invention.

FIG. 5 shows a block diagram of a filling level radar device with potential separation 10c according to a further exemplary embodiment of the present invention. In this arrangement the potential separation 10c is arranged between the evaluation circuit 6 and the receiver 5 and additionally extends through the voltage supply 7. The line 12 for activation of the transmission circuit 2 by the evaluation circuit 6, and the line 16 for conveying the receiver output signal to the evaluation circuit 6 are separated by the optical couplers 21. It may also be possible to provide transformers or capacitive couplings.

Figure 6:
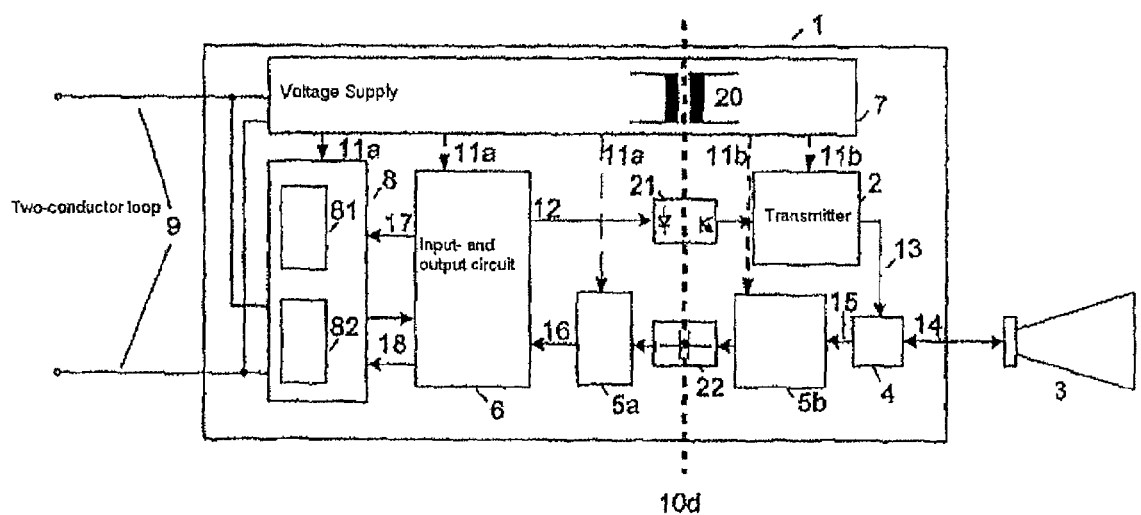
FIG. 6 shows a diagrammatic view of a filling level radar device according to a further exemplary embodiment of the present invention.

FIG. 6 shows a block diagram of a filling level radar device with potential separation 10d according to a further exemplary embodiment of the present invention. In this arrangement the potential separation 10d extends through the receiver 5a, 5b and through the voltage supply 7. In the signal line 12, separation is provided by way of an optical coupler 21. Within the receiver 5a, 5b, potential separation takes place by way of capacitive potential separation 22. This capacitive potential separation 22 transmits, for example, an intermediate frequency signal that has been generated by scanning and/or frequency conversion from the microwave receiving signal. The intermediate frequency signal is, for example, a direct-voltage-free alternating voltage signal with a frequency ranging from several kHz to MHz; it can particularly easily be transmitted by way of coupling capacitors in the go-and-return line.

Figure 16:
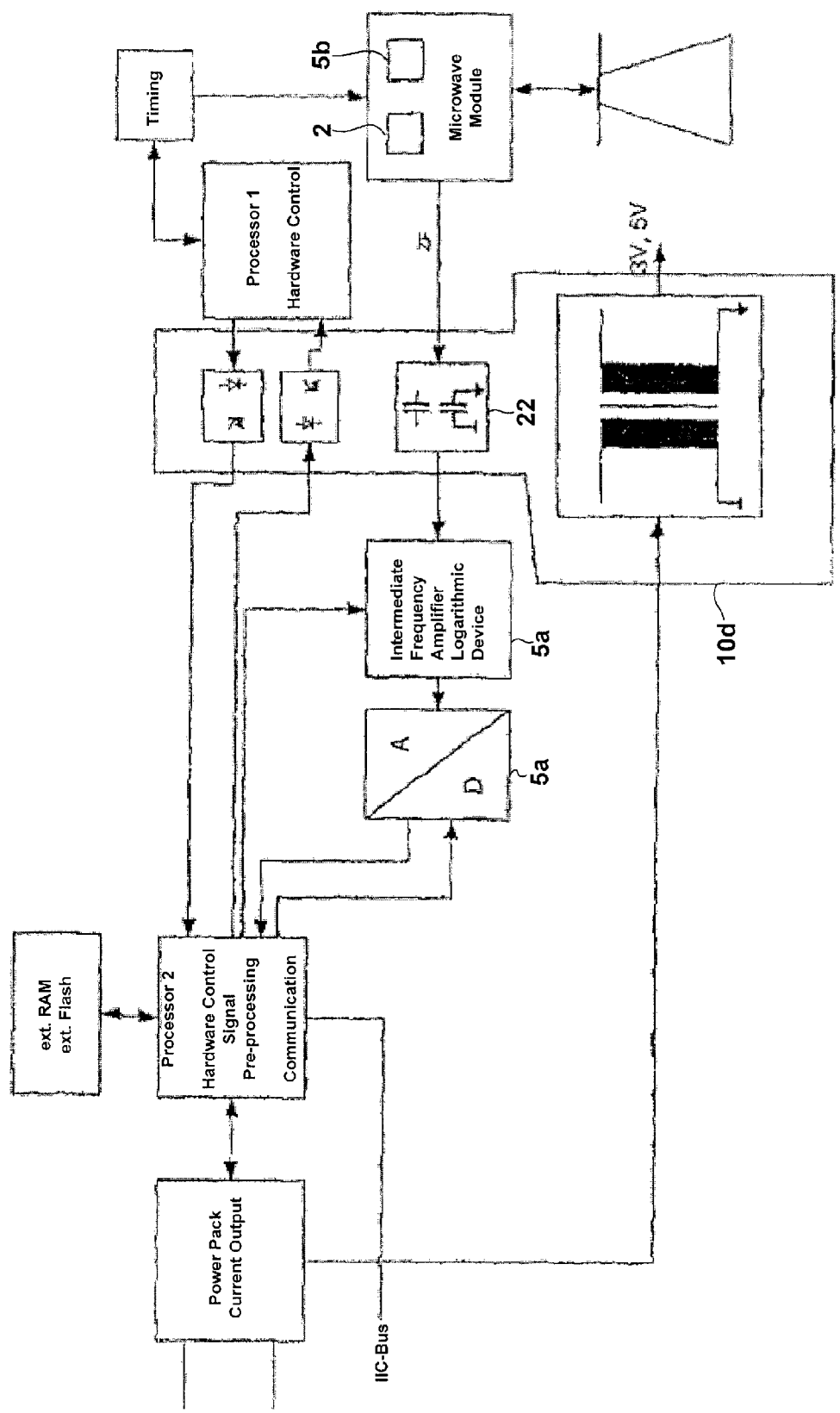
FIG. 16 shows a block diagram of the potential separation of FIG. 6 according to an exemplary embodiment of the present invention.

FIG. 16 shows an exemplary embodiment in which such potential separation 10d has been implemented.

Figure 7:
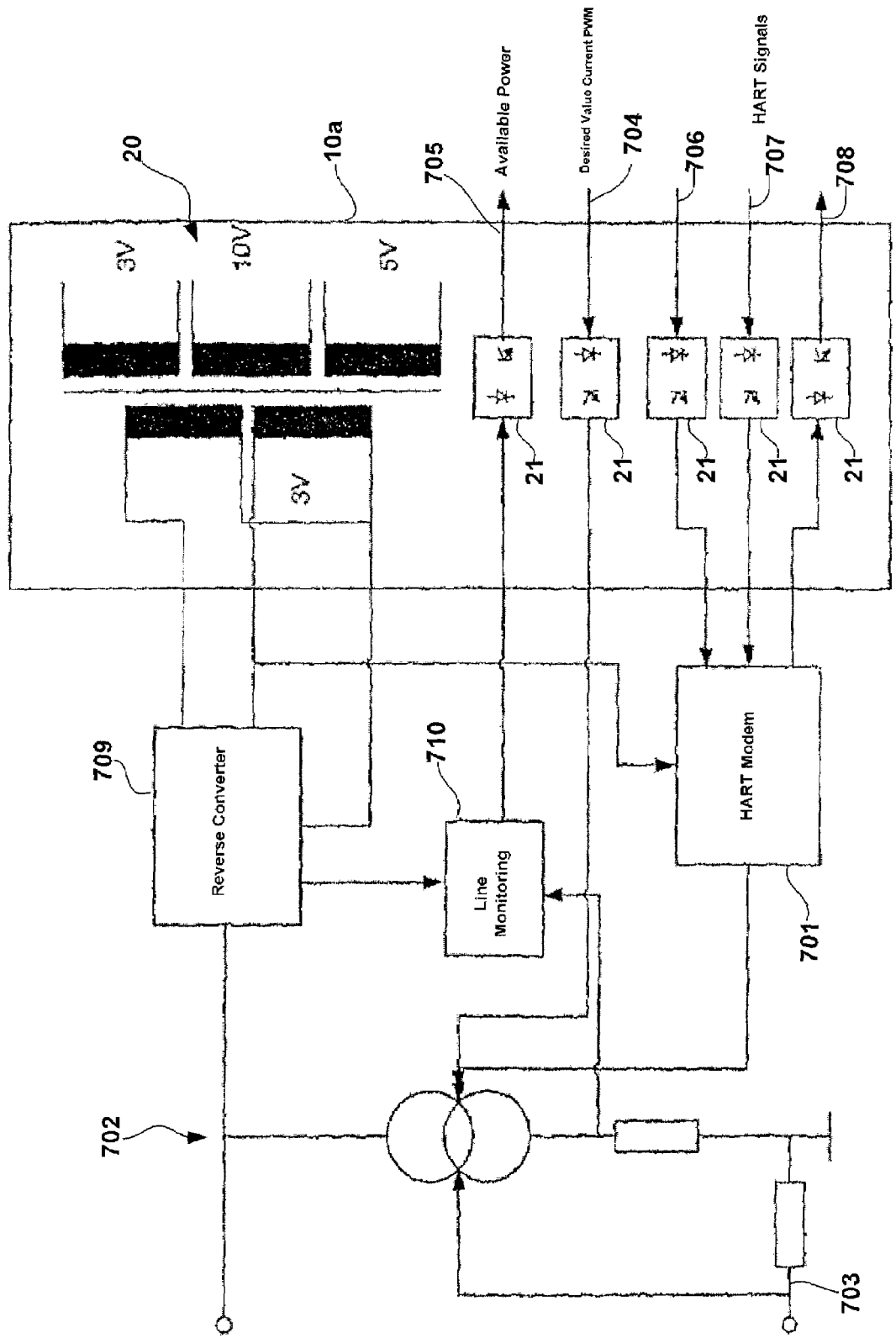
FIG. 7 shows a block diagram of the potential separation of FIG. 3.

FIG. 7 shows a diagrammatic view of the potential separation according to FIG. 3 according to an exemplary embodiment of the present invention. To this effect, potential separation 10a comprises a DC/DC converter 20 with inductive separation within the voltage supply and optical couplers 21 for separating the signals between the evaluation circuit 6 and the input- and output circuit 8 (see FIG. 3).

The input- and output circuit 8 comprises a HART modem 701 for implementing digital communication on the two-conductor loop, and a current regulator 702, which on the one hand senses the actual value 703 by way of the resistor in the negative feed line, and on the other hand receives the desired value 704, in a potential-separated manner, e.g. by way of PWM (pulse width modulation), from the evaluation circuit 6 (not shown in FIG. 7). Current regulation takes place parallel in relation to the sensor input, i.e. the parallel-flowing current is regulated such that the sum of all currents results in the current 4 . . . 20 mA to be set.

For optimal utilisation of the available output a signal "available output" 705 is generated in order to be able to optimally design intermittent operation of the sensor by the evaluation circuit. This signal 705 is, for example, a digital signal (generated by a comparator) in order to transmit said signal in a simple manner across the separation point 10a. Likewise, the HART signals 706, 707, 708 are digital signals.

Furthermore, a reverse converter 709 and a line monitor 710 are provided. In this arrangement the reverse converter 709 may transfer signals, e.g. a voltage signal that is proportional to the input voltage of the reverse converter, to the line monitor 710. The line monitor 710 receives additional signals, e.g. a signal that is proportional to the parallel-flowing current, from the parallel current regulator 702. Subsequently, from one or several of the received signals the signal "available output" is then generated.

Figure 8:
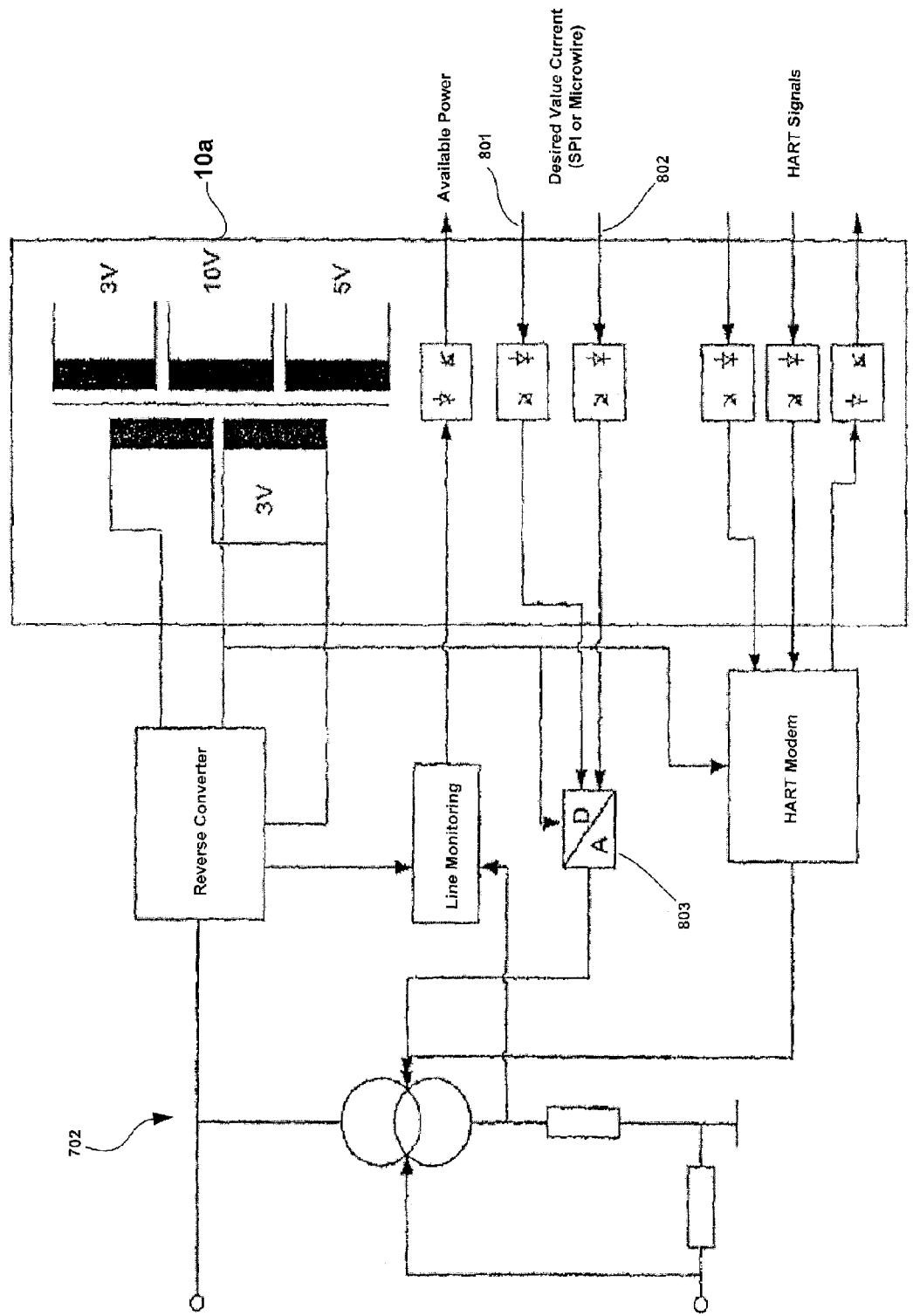
FIG. 8 shows a block diagram of FIG. 3 according to a further exemplary embodiment of the present invention.

FIG. 8 shows a block diagram of the potential separation according to FIG. 3 according to a further exemplary embodiment of the present invention. The difference when compared to the exemplary embodiment shown in FIG. 7 relates to the transmission of the measuring value from the evaluation circuit to the input- and output circuit. Instead of a PWM signal 704 (see FIG. 7), a digital signal 801, 802 is transmitted. This transmission takes place, for example, by way of predefined digital two-conductor interfaces SPC or microwire. However, other interfaces may also be possible.

Furthermore, a digital/analogue converter 803 is provided, which generates an analogue desired value for the regulator 702.

Figure 9:
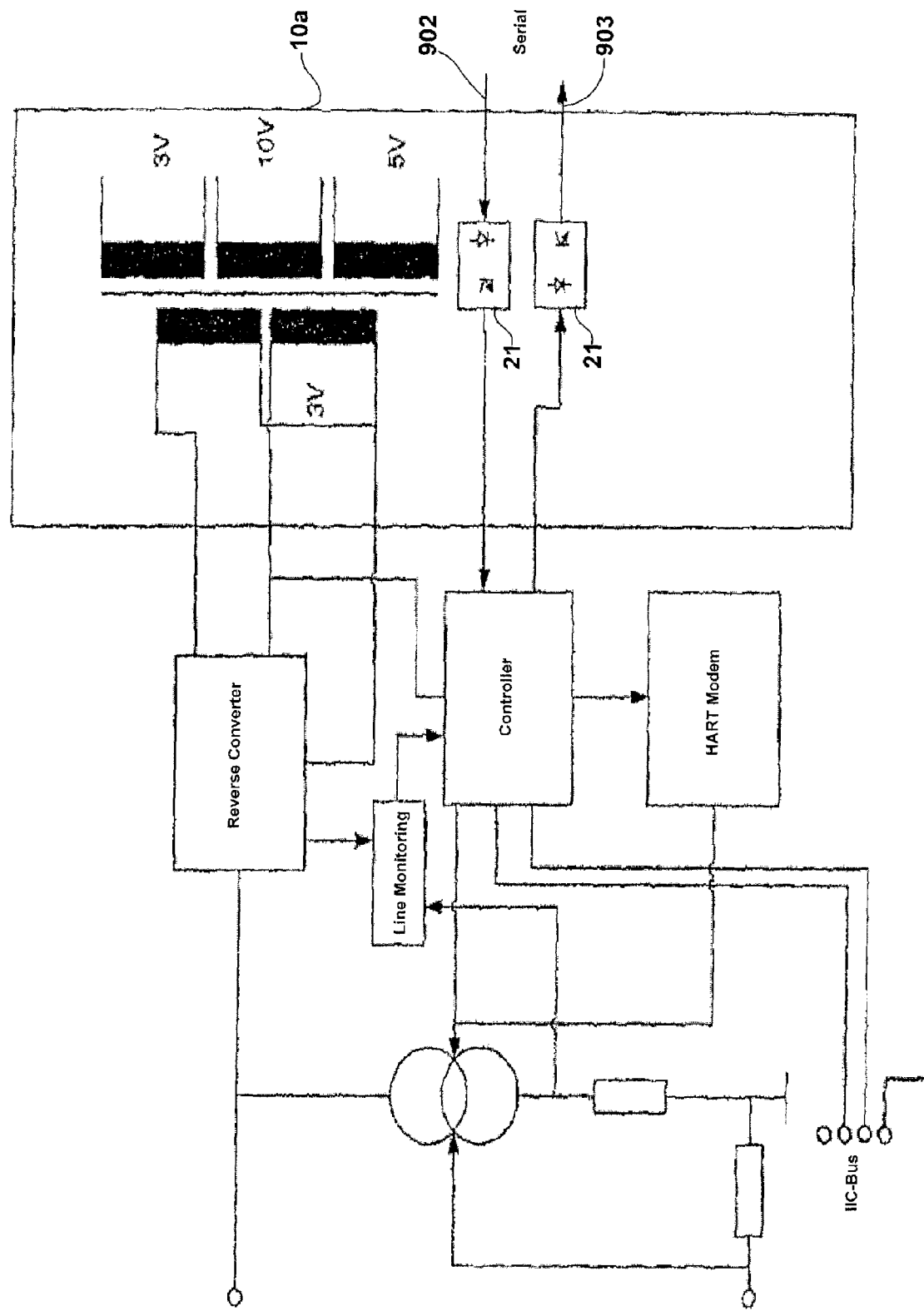
FIG. 9 shows a block diagram of the potential separation of FIG. 3 according to a further exemplary embodiment of the present invention.

FIG. 9 shows a further exemplary embodiment of the potential separation 10a according to FIG. 3. The input- and output circuit 8 comprises a microcontroller 901 that communicates digitally with the microcontroller of the evaluation circuit 6 (see FIG. 3). The corresponding signals 902, 903 can in a simple manner be separated by means of two optical couplers 21 or as an alternative by way of one or several capacitive couplings. Furthermore, an additional digital interface on the sensor is possible, such as e.g. an IIC bus interface for on-site operation of the sensor, for example by way of a display-operating unit or a laptop.

Figure 10:
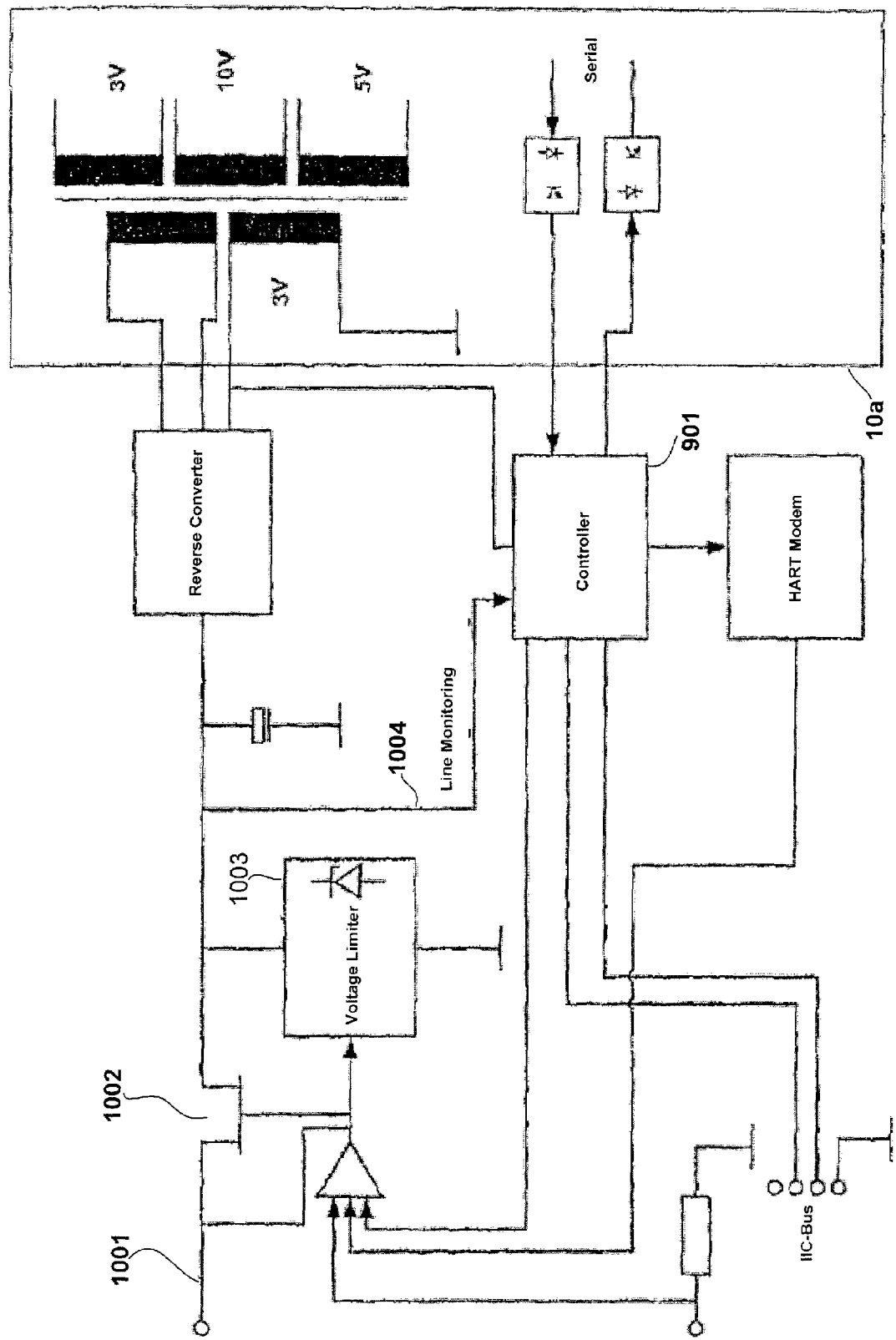
FIG. 10 shows a further block diagram of FIG. 3 according to a further exemplary embodiment of the present invention.

FIG. 10 shows a further exemplary embodiment of the potential separation 10a of FIG. 3. The difference when compared to the exemplary embodiment shown in FIG. 9 relates to the type of current regulation. Instead of current regulation parallel to the sensor input, in this arrangement the current is regulated by the transistor 1002 that is located longitudinally in the positive line 1001. This necessitates a circuit block 1003, arranged in parallel downstream, for limiting the voltage, by way of which circuit block 1003 the output not required by the sensor is consumed. The signal 1004 "line monitoring" is again used for good utilisation of the available output, with said signal 1004 being transmitted to the microcontroller 901.

Figure 11:
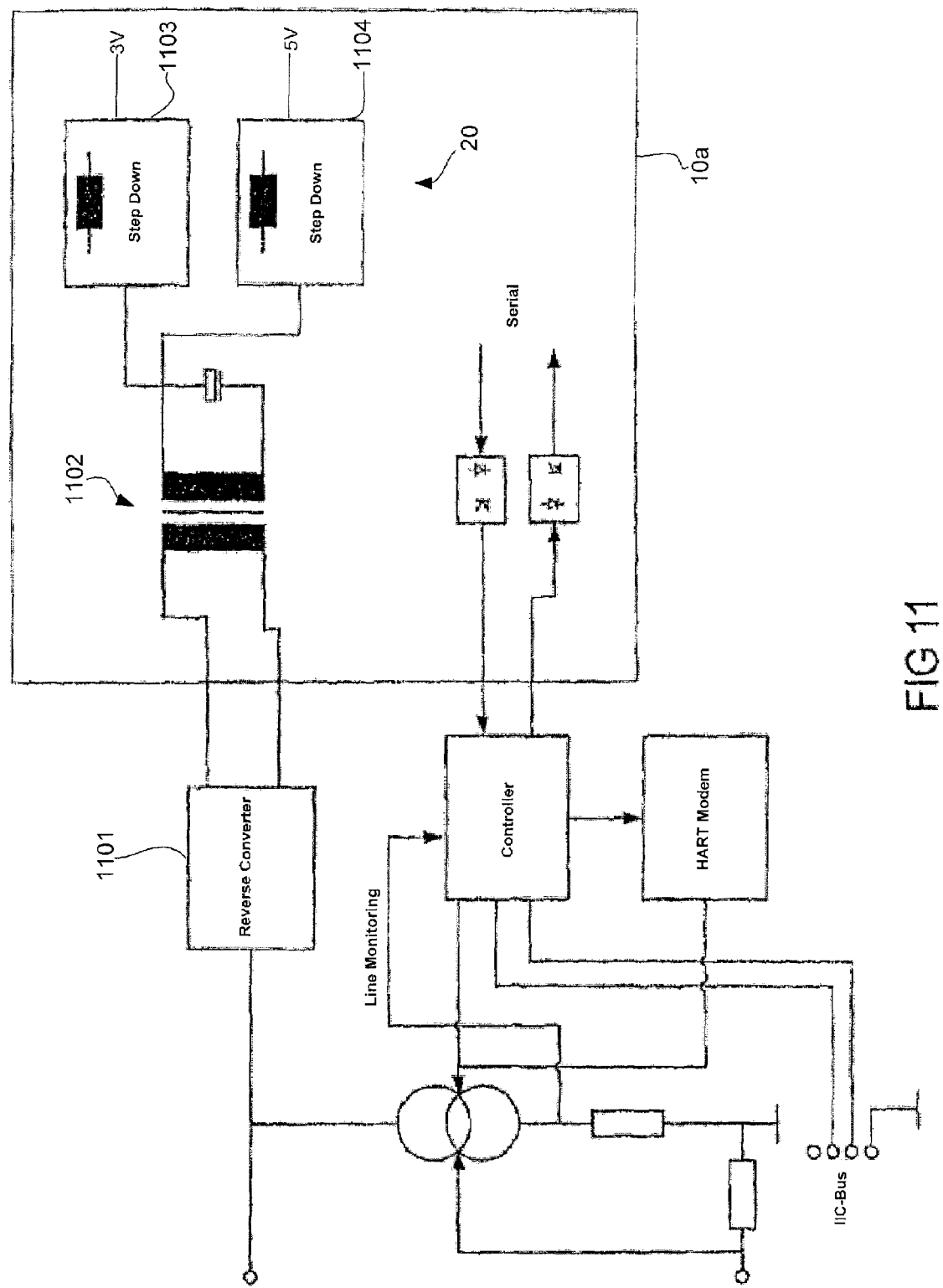
FIG. 11 shows a block diagram of the potential separation of FIG. 3 according to a further exemplary embodiment of the present invention.

FIG. 11 shows a further exemplary embodiment of the potential separation 10a of FIG. 3. In this arrangement the DC/DC converter 20 has been modified. A reverse converter 1101 only generates a voltage that is converted to a secondary voltage by way of the inductive coupling 1102, wherein this arrangement uses a comparatively simple separation transformer. Behind it, several step-down converters 1103, 1104 then generate the various voltages (for example 3 V and 5 V).

Figure 12:
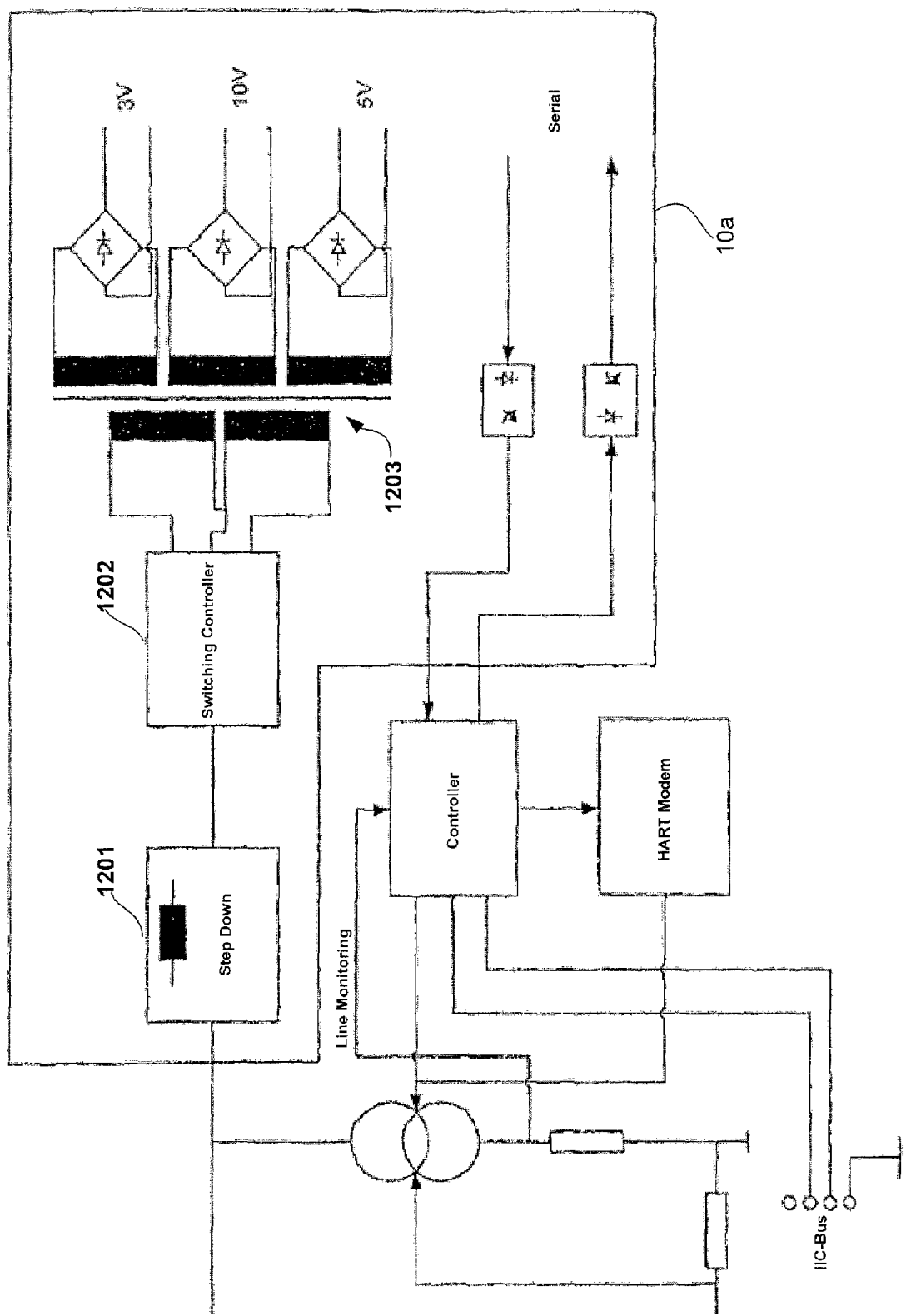
FIG. 12 shows a block diagram of FIG. 3 according to a further exemplary embodiment of the present invention.

FIG. 12 shows a further exemplary embodiment of the potential separation 10a with a power pack concept that differs from that shown in FIGS. 9 and 11. In this arrangement a step-down converter 1201 is provided, to which a switching controller 1202 is connected. The switching controller 1202 comprises a separation transformer 1203, which generates several secondary voltages (for example 3 V, 10 V, 5 V).

Figure 13:
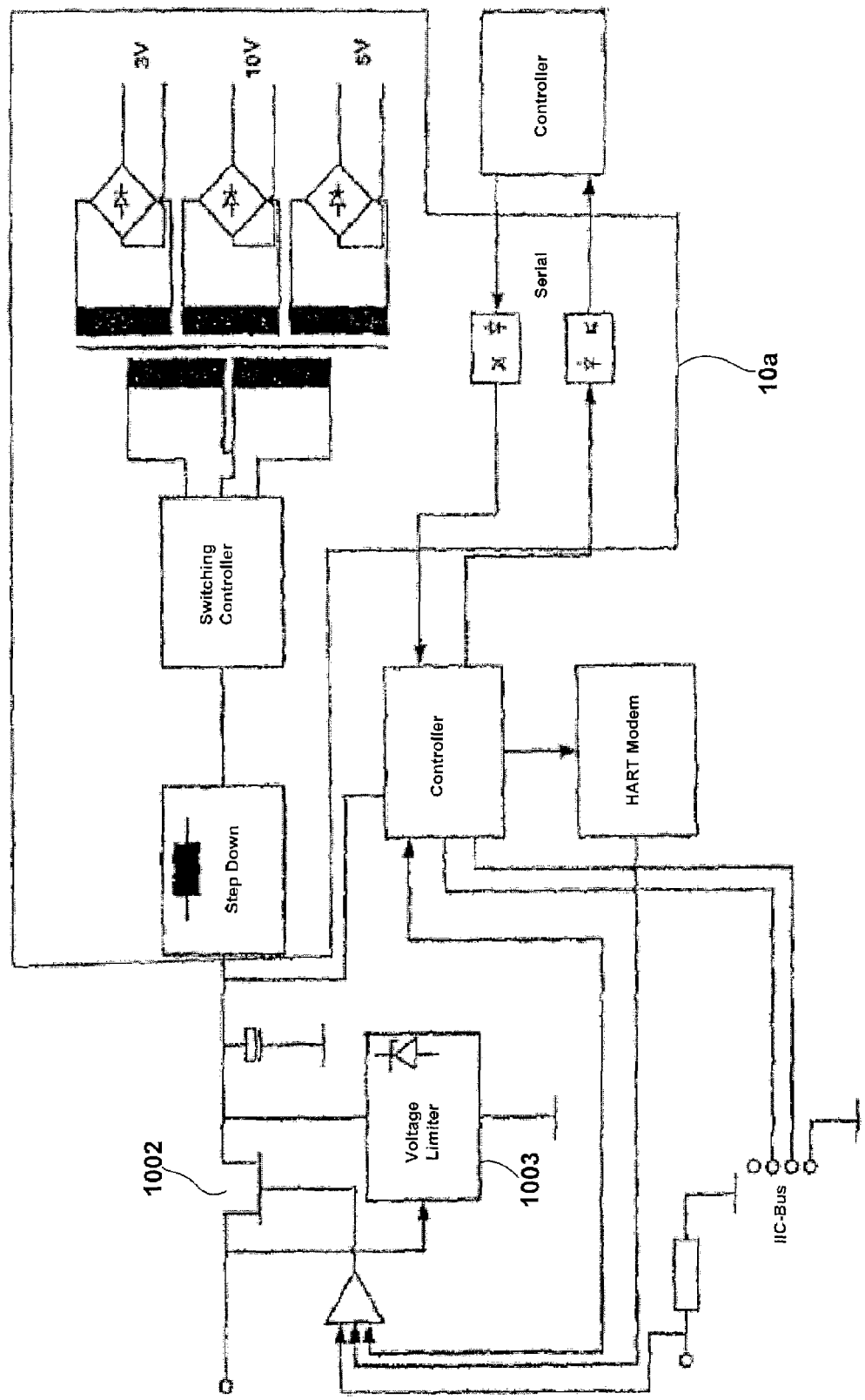
FIG. 13 shows a block diagram of FIG. 3 according to a further exemplary embodiment of the present invention.

FIG. 13 shows a similar exemplary embodiment to the one in FIG. 12, except that in the present arrangement current regulation is not effected in parallel but instead in series by way of the transistor 1002 and the voltage limiter 1003 (FIG. 10).

Figure 14:
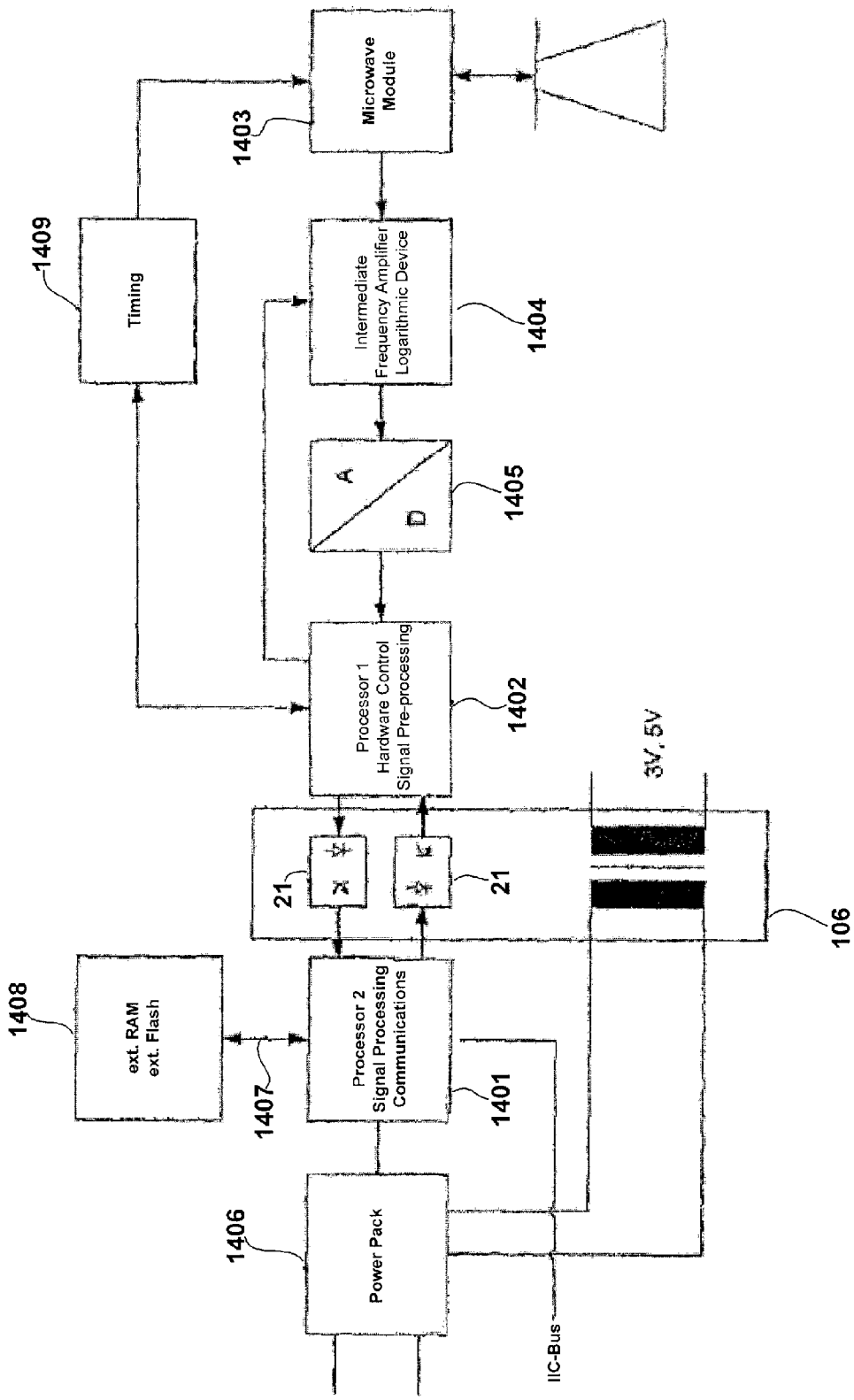
FIG. 14 shows a block diagram of the potential separation of FIG. 4 according to an exemplary embodiment of the present invention.

FIG. 14 shows a further exemplary embodiment of the potential separation according to FIG. 4A. This arrangement provides for two processors 1401, 1402 that are located on different sides of the potential separation 10b and that form part of the evaluation circuit 6 (see FIGS. 4A, 4B). The two processors 1401, 1402 share signal evaluation. The processor 1402 further handles hardware control, wherein this involves, for example, the organisation of the intermittent operation and the control of clock pulse circuits (timing) 1409. The microwave module 1403 comprises a microwave transmission circuit and a microwave reception circuit. The intermediate frequency amplifier and logarithmic device 1404 and the A/D converter 1405 may also be regarded as forming part of the receiving circuit; but they process an intermediate frequency signal or envelope signal.

Communication of the two processors 1401, 1402 between each other for conveying measuring data and for transmitting setting-parameters takes place by way of the separating optical couplers 21 or by way of corresponding capacitive separations or inductive transformers (not shown in FIG. 14).

The second processor 1401, which is provided for signal processing and for communication, is connected to the power pack 1406 and can furthermore communicate with an external RAM or an external flash 1408 by way of the line 1407.

Figure 15:
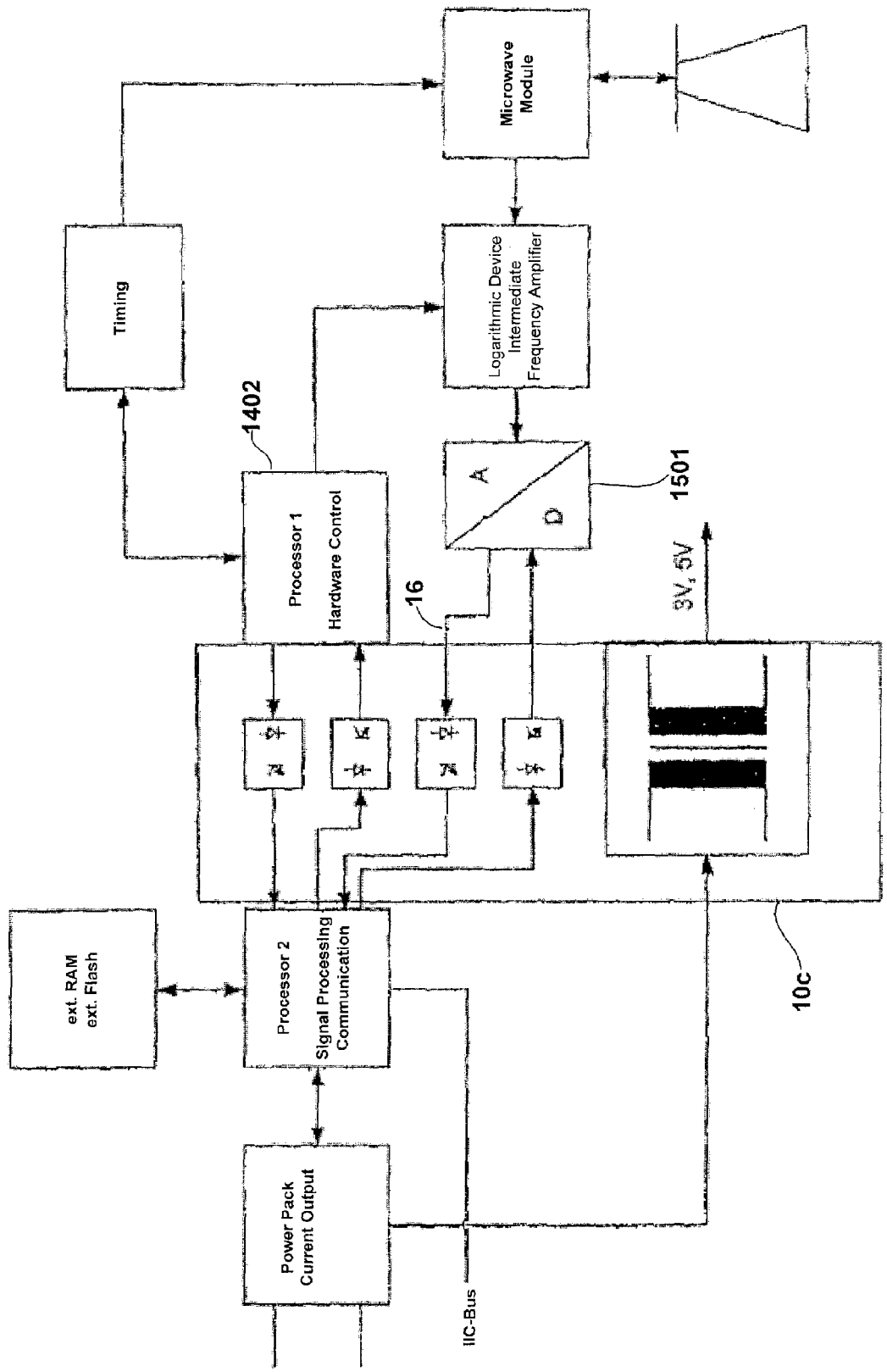
FIG. 15 shows a block diagram of the potential separation of FIG. 5 according to an exemplary embodiment of the present invention.

FIG. 15 shows a further exemplary embodiment of the present invention with potential separation according to FIG. 5. The potential separation 10c is arranged between the evaluation circuit 6 and the receiver 5 (see FIG. 5). The processor 1402 is used for hardware control and does not carry out any function of the evaluation circuit. Said processor 1402 is only used for the hardware control of the transmission- and receiving circuit. The output signal 16 of the receiver in this case is a digital envelope signal (digitalised by A/D converter 1501) which can easily be transmitted across the separation point 10c.

FIG. 16 shows a further exemplary embodiment of potential separation according to an exemplary embodiment of the present invention. In this arrangement, potential separation 10d takes place within the receiver 5a, 5b. Here, the fact that the intermediate frequency signal is a direct-voltage-free alternating signal that can be optimally separated by capacitors 22 is used.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. A filling level radar for measuring a filling level in a container and for connection to a two-wire loop, comprising:
   an electronics unit generating a transmission signal and receiving and evaluating a receiving signal, the unit generating and emitting an output signal as a function of the evaluated receiving signal;
   a potential separation situated within the unit and providing a galvanic separation of first signals in a first region of the unit from second signals in a second region of the unit; and
   a voltage supply;

wherein the unit includes an input- and output circuit which regulates and emits the output signal and which is arranged in the first region;

wherein the electronics unit comprises a second electronics component that is arranged in the second region;

wherein the voltage supply is adapted for supplying the input and output circuit of the electronics unit with a first operating signal and for supplying a second electronics component of the electronics unit with a second operating signal;

wherein the transmission signal is generated in the second region; and wherein the potential separation is designed for separating the first operating signal from the second operating signal within the voltage supply.

2. The filling level radar according to claim 1, wherein the input- and output circuit receives external input signals.

3. The filling level radar according to claim 1, wherein the input- and output circuit regulates an output current of the two-wire loop.

4. The filling level radar according to claim 2, wherein the output signal is a digital output signal and wherein the input- and output circuit modulates the digital output signal and demodulates a digital input signal.

5. The filling level radar according to claim 1, wherein the potential separation includes a inductive separation within the voltage supply.

6. The filling level radar according to claim 1, wherein the unit further includes an evaluation circuit evaluating the receiving signal.

7. The filling level radar according to claim 6, wherein the receiving signal is evaluated using (i) an identification of a filling level echo and (ii) provision of a digitalised filling level value to the input- and output circuit.

8. The filling level radar according to claim 1, wherein the unit further includes a transmitter which generates the transmission signal.

9. The filling level radar according to claim 8, wherein the transmitter is a microwave transmission circuit.

10. The filling level radar according to claim 8, wherein the transmitter includes at least one of a clock pulse circuit, an oscillator, a modulation circuit and a transmission amplifier.

11. The filling level radar according to claim 1, wherein the unit further includes a receiver which receives the measuring signal.

12. The filling level radar according to claim 11, wherein the receiver is a microwave receiving circuit.

13. The filling level radar according to claim 11, wherein the receiver includes at least one of a receiving amplifier, a mixer, a clock pulse circuit, an oscillator, a filter, an intermediate frequency amplifier, a demodulator, a logarithmic device, and an analogue/digital converter.

14. The filling level radar according to claim 1, wherein the voltage supply includes at least one of a DC/DC convener, a filter, a voltage regulator and a storage capacitor.

15. The filling level radar according to claim 1, wherein the potential separation separates digital signals.

16. The filling level radar according to claim 1, wherein the potential separation separates direct-voltage-free alternating signals.

17. The filling level radar according to claim 1, wherein the potential separation is situated within the evaluation circuit.

18. The filling level radar according to claim 1, wherein the potential separation is situated between the evaluation circuit, which is arranged in the first region, and the receiver, which is arranged in the second region.

19. The filling level radar according to claim 1, wherein the potential separation is situated within the receiver.

20. The filling level radar according to claim 1, wherein the potential separation includes an optical coupler.

21. The filling level radar according to claim 1, wherein the filling level radar (i) connects to a two-wire loop to supply energy to a filling level measuring device and (ii) emits the output signals to a single line pair.

22. The filling level radar according to claim 21, wherein the two-wire loop is a 4 . . . 20 mA two-wire current loop.

23. A method for measuring a filling level, comprising:

supplying, by means of a voltage supply, an input and output circuit of an electronics unit with a first operating signal and supplying a second electronics component of the electronics unit with a second operating signal;

generating a transmission signal;

receiving and evaluating a receiving signal;

generating and emitting an output signal as a function of the evaluated receiving signal;

separating first signals in a first region of an electronics unit from second signals in a second region of the electronics unit using a potential separation situated within the electronics unit;

separating the first operating signal from the second operating signal within the voltage supply; and emitting the output signal using an input- and output circuit that is arranged in the first region;

wherein the transmission signal is generated in the second region, and wherein the input and output circuit is arranged in the first region and wherein the second electronics component is arranged in the second region.

24. The method according to claim 23, further comprising:

receiving external input signals; and regulating an output current of a two-wire loop using the input- and output circuit.

25. The method according to claim 23, wherein the input- and output circuit modulates a digital output signal and demodulates a digital input signal.

* * * * *